United States Patent Office
2,876,244
Patented Mar. 3, 1959

2,876,244

PRODUCTION OF HETEROCYCLIC DITHIO-PHOSPHORIC ESTERS

William M. Lanham, Charleston, W. Va., assignor to Union Carbide Corporation, a corporation of New York No Drawing. Application December 30, 1954
Serial No. 478,907

13 Claims. (Cl. 260—461)

This invention relates to the production of a novel class of heterocyclic 1,3-dioxa-2-thiono-2-phosphacycloalkylthio carboxylic esters containing phosphorus in the heterocyclic ring. More especially it concerns the production of novel esters of 1,3-dioxa-2-thiono-2-phosphacyclopentylthio and 1,3 - dioxa - 2 - thiono-2-phosphacyclohexylthio mono- and polycarboxylic acids having structures corresponding to the formula

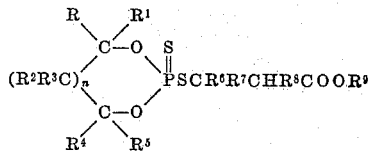

wherein $R^1$, $R^2$, $R^3$, $R^4$ and $R^5$, respectively, designates a radical of the class consisting of hydrogen and the alkyl radicals, preferably those having from 1 to 20 carbon atoms; $n=0$ or 1; $R^6$ and $R^7$, respectively, designates a radical of the class consisting of hydrogen, the lower alkyl and alkenyl radicals having one to four carbon atoms, and the $C_6H_5$—, —CN, —Cl, —COOR$^9$ and —CH$_2$COOR$^9$ radicals wherein $R^9$ designates a radical of the class consisting of the alkyl, cycloalkyl, alkoxyalkyl, aralkyl, aryl and alkaryl radicals; and $R^8$ designates a radical of the class consisting of hydrogen, the lower alkyl and monocyclic aromatic hydrocarbon radicals, and the —Cl, —CN, —COOR$^9$ and —CH$_2$COOR$^9$ radicals.

The novel compounds of the invention are useful as pesticides. Certain of these compounds have proven effective in aqueous suspensions for the control of bean aphids. The compounds also have potential utility as plasticizers for synthetic resins, and as corrosion inhibitors, flotation agents and petroleum additives.

The compounds of the invention can be produced by reacting a heterocyclic dithiophosphoric acid of the formula

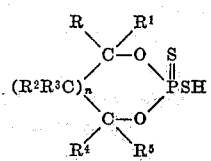

wherein R, $R^1$, $R^2$, $R^3$, $R^4$ and $R^5$, respectively, designates hydrogen or an alkyl group, and $n$ is 0 or 1, with an ester of an alpha, beta-olefinically unsaturated carboxylic acid, which may be substituted on either or both of the hydrogen atoms attached to the beta-carbon atoms and/or on the hydrogen atom attached to the alpha-carbon atom, by an alkyl, alkenyl, aryl, cyano, chloro, esterified carboxyl, or esterified methylenecarboxyl group. Especially suitable olefinically unsaturated carboxylic esters useful as starting materials are those of the formula $$CR^6R^7=CR^8COOR^9$$

wherein $R^6$, $R^7$, $R^8$ and $R^9$ have the designations previously indicated.

The reaction can be conducted at temperatures within the range from about —20° C. to about 150° C., but temperatures within the range from 25° C. to 100° C. are preferred to avoid some product losses by decomposition with loss of hydrogen sulfide. While usually one of the reactants is fed dropwise in small successive portions to a solution or suspension of the other reactant in an inert solvent or diluent, the two reactants may be mixed together at the outset in molar ratios of from 0.5:1 to 3:1 of the unsaturated ester reactant to the phosphorus-containing reactant.

If desired, the reaction can be conducted in the presence as catalyst of the aliphatic tertiary amines, such as triethylamine, and anhydrous alkali metal hydroxides and carbonates although the use of a catalyst is not necessary. When the carboxylic ester used as starting material is highly reactive, a polymerization inhibitor such as hydroquinone preferably is used.

The reaction usually is conducted in the presence of an inert solvent, particularly where one or both of the reactants are solids. Useful solvents include saturated esters of aliphatic acids of the fatty acid series such as ethyl acetate, amyl acetate, 2-ethylhexyl acetate, methyl propionate, and methyl and ethyl butyrates; ketones such as acetone, methyl isobutyl ketone; ethers such as dioxane; aromatic compounds such as benzene, toluene, xylenes, chlorobenzene and nitrobenzene; chlorinated solvents such as carbon tetrachloride and chloroform; trialkyl phosphates such as triethyl and tri-(2-ethylhexyl)phosphates; and saturated nitriles such as acetonitrile and propionitrile.

The novel products of the invention can be recovered from the reaction mixture by fractionally distilling the later under high vacuum to remove any unreacted starting material, solvent and by products. Preferably, however, the reaction mixture is first washed with a dilute solution of sodium bicarbonate or the equivalent, washed with water, and the washed product stripped of unreacted materials and solvent by distillation under high vacuum. The desired product is recovered in good purity as a still residue.

Among unsaturated carboxylic esters useful in the process may be mentioned the methyl, ethyl, butyl, hexyl, 2-ethylhexyl, octyl, decyl, tetradecyl, octadecyl, phenyl, benzyl, cyclohexyl, ethoxyethyl and butoxyethyl esters of the following alpha, beta-olefinically unsaturated monocarboxylic acids: acrylic, methacrylic, alpha-ethacrylic, crotonic, tiglic, alpha-ethylcrotonic, sorbic, alpha-methylsorbic, cinnamic, 2-chloroacrylic, 2-cyano-3-phenylacrylic, 2-chlorocrotonic and 2-cyano-3-phenylcrotonic acids; and the corresponding mono- and diesters of alpha, beta-unsaturated di- and polycarboxylic acids, such as maleic, fumaric, methylenemalonic, methylenesuccinic, benzylidenemalonic, aconitic, citraconic, ethylenetetracarboxylic, mono- and dichloromaleic, monocyanomaleic and 2,3-dicyanomaleic acids.

The following equation illustrates the type of reaction involved when the ester reactant is a dicarboxylic acid ester:

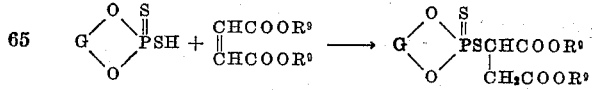

where G designates a hydrocarbon radical of the formula —CRR$^1$(CR$^2$R$^3$)$_n$CR$^4$R$^5$— wherein R, $R^1$, $R^2$, $R^3$, $R^4$ and $R^5$, respectively, designates a member of the class consisting of hydrogen and the alkyl groups, and $n=0$ or 1. To illustrate the invention further, by reacting a compound of the formula

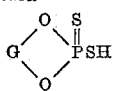

with the following esters, compounds indicated in the table are produced.

TABLE

| Unsaturated Ester | Product |
|---|---|
| phenyl acrylate | G⟨O,O⟩P(=S)SCH$_2$CH$_2$COOC$_6$H$_5$ |
| decyl crotonate | G⟨O,O⟩P(=S)SCH(CH$_3$)CH$_2$COOC$_{10}$H$_{21}$ |
| butyl methacrylate | G⟨O,O⟩P(=S)SCH$_2$CH(CH$_3$)COOC$_4$H$_9$ |
| ethyl sorbate | G⟨O,O⟩P(=S)SCH(CH=CHCH$_3$)CH$_2$COOC$_2$H$_5$ and/or G⟨O,O⟩P(=S)SCH(CH$_3$)CH=CHCH$_2$COOC$_2$H$_5$ |
| ethyl 3-phenyl-2-cyanoacrylate | G⟨O,O⟩P(=S)SCH(C$_6$H$_5$)CH(CN)COOC$_2$H$_5$ |
| diethyl maleate | G⟨O,O⟩P(=S)SCH(COOC$_2$H$_5$)CH$_2$COOC$_2$H$_5$ |
| butyl cinnamate | G⟨O,O⟩P(=S)SCH(C$_6$H$_5$)CH$_2$COOC$_4$H$_9$ |
| dibutyl itaconate | G⟨O,O⟩P(=S)SCH$_2$CH(CH$_2$COOC$_4$H$_9$)COOC$_4$H$_9$ |
| diethyl methylenemalonate | G⟨O,O⟩P(=S)SCH$_2$CH(COOC$_2$H$_5$)COOC$_2$H$_5$ |
| diethyl benzylidenemalonate | G⟨O,O⟩P(=S)SCH(C$_6$H$_5$)CH(COOC$_2$H$_5$)COOC$_2$H$_5$ |
| triethyl aconitate | G⟨O,O⟩P(=S)SCH(CH$_2$COOC$_2$H$_5$)CH(COOC$_2$H$_5$)COOC$_2$H$_5$ and/or G⟨O,O⟩P(=S)SC(CH$_2$COOC$_2$H$_5$)(COOC$_2$H$_5$)CH$_2$COOC$_2$H$_5$ |
| tetraethyl ethylene tetracarboxylate | G⟨O,O⟩P(=S)S-C(COOC$_2$H$_5$)(C$_2$H$_5$OOC)CH(COOC$_2$H$_5$)(COOC$_2$H$_5$) |
| methyl 2-chloroacrylate | G⟨O,O⟩P(=S)SCH$_2$CH(Cl)COOCH$_3$ |

The heterocyclic dithiophosphoric acid starting materials can be produced by reacting phosphorus pentasulfide with an alkane-1,2-diol or an alkane-1,3-diol at temperatures within the range from 25° C. to 100° C. and above, preferably in the presence of an inert solvent for the diol and reaction products, and removing the by-product hydrogen sulfide as it is formed. Such a process is described in my pending application Serial No. 387,064, filed October 19, 1953.

The following examples will serve to illustrate the invention.

*Example 1*

38 grams (0.158 mol) of 5-ethyl-2-mercapto-4-propyl-2-thiono-1,3,2-dioxaphosphorinane and 50 grams (0.29 mol) of diethyl maleate were rapidly poured together into a reaction flask which was then heated to 100° C. for a period of around 8 hours. An additional 25 grams (0.145 mol) of diethyl maleate were added and the reaction mixture heated at 100° C. for 7 additional hours. The mixture was then washed with dilute aqueous sodium bicarbonate, washed with water until neutral to litmus, and stripped by distillation to a kettle temperature of 120° C. under less than 2 mm. of mercury pressure. The resultant diethyl 1,3-dioxa-5-ethyl-4-propyl-2-thiono-2-phosphacyclohexylthiosuccinate was a clear slightly yellow liquid residue having the following properties: acidity=0.02 cc. of normal KOH/g.; salt=0.03 cc. of N HClO$_4$/g.; $n_D^{30}$=1.5009; analysis, percent by weight: percent P=7.36 (theory=7.51); percent S=14.8 (theory=15.54); percent C=46.68 (theory=46.59); percent H=7.02 (theory=6.84); percent yield=85 (based on the phosphorus-containing reactant).

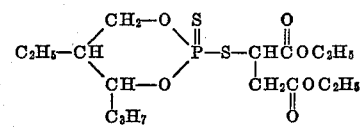

*Example 2*

To an agitated solution of 12 grams (0.057 mol) of 2 - mercapto - 4,4,5,5 - tetramethyl - 2 - thiono - 1,3,2-dioxaphospholane in 100 grams of benzene held at 25° C., there were added dropwise during 3 minutes 8.5 grams (0.05 mol) of diethyl maleate. The reaction mixture stood at 25° C. for 87 hours and then was heated at 40° C. for 106 hours. It then was neutralized with 15% aqueous sodium bicarbonate, washed with water until neutral to litmus, dried over calcium sulfate, and was stripped by distillation to a kettle temperature of 120° C. under less than 1 mm. of mercury pressure. The resultant diethyl 1,3-dioxa-4,4,5,5-tetramethyl-2-thiono-2-phosphacyclopentylthiosuccinate was a light brown liquid residue which, after filtering, had the following properties: acidity=0.02 cc. of normal KOH/g.; salt=0.006 cc. of N HClO$_4$/g.; $n_D^{30}$=1.5018; analysis, percent by weight: percent P=7.78; percent C=45.09; percent H=6.79; percent S=15.2; percent yield =50.

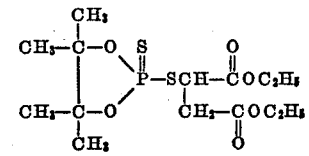

*Example 3*

To one mol of diethyl maleate held at 95°–100° C. with agitation there were added dropwise during 20 minutes a solution of 0.4 mol of 2-mercapto-2-thiono-4,4,6-trimethyl-1,3,2-dioxaphosphorinane in 100 grams of toluene. The reaction mixture was agitated 12 hours at 100° C. and then was washed with a dilute aqueous sodium bicarbonate solution, diluted with 500 cc. of ethyl ether, washed with water until neutral to litmus and stripped by distillation at 100° C. under a pressure of less than 0.2 mm. of mercury, using a falling film type still. The resultant diethyl 1,3-dioxa-2-thiono-4,4,6-trimethyl-2-phosphacyclohexylthiosuccinate was recovered as a light brown liquid residue having the following properties: acidity=0.05 cc. of normal KOH/g.; salt= 0.004 cc. of N HClO₄/g.; $n_D^{30}$=1.5081; analysis, percent by weight: percent P=7.72; percent S=16.75; percent C=44.39; percent H=6.62; percent yield=44 (based on phosphorus-containing reactant).

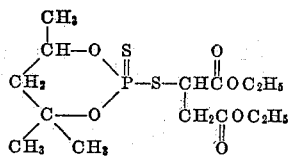

*Example 4*

During 5 minutes 0.135 mol of 2-mercapto-4-methyl-2-thiono-1,3,2-dioxaphospholane were added to 0.27 mol of diethyl maleate with agitation while maintaining the mixture at 60° C. The mixture was then held at 25° C. for 78 hours and was then stripped by distillation to a kettle temperature of 78° C. under less than 0.2 mm. of mercury, using a falling film type still. The resultant diethyl 1,3-dioxa-4-methyl-2-thiono-2-phosphacyclopentyl-thiosuccinate was secured as a clear colorless liquid residue having the following properties: acidity=0.13 cc. of normal KOH/g.; $n_D^{30}$=1.5065; analysis, percent by weight: percent P=9.14; percent S=18.1; percent C=37.36; percent H=5.41; percent yield=59 (based on the phosphorus compound).

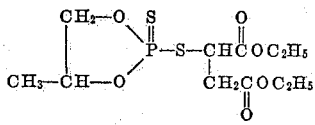

*Example 5*

One mol of ethyl acrylate containing 0.1 gram of hydroquinone was added dropwise to an agitated suspension of 0.3 mol of 5,5-diethyl-2-mercapto-2-thiono-1,3,2-dioxaphosphorinane in 200 grams of toluene during 30 minutes at a reaction temperature of 25°–30° C. Thereafter the reaction mixture was neutralized with dilute aqueous sodium bicarbonate, washed with water until neutral to litmus, 0.1 grams of hydroquinone was added to inhibit polymerization, and the mixture was stripped by distillation to a kettle temperature of 80° C. under less than 4 mm. of mercury. The resultant 2-(2-carbethoxyethylmercapto)-5,5-diethyl-2-thiono-1,3,2-dioxaphosphorinane was secured as a solid residue having the following properties: acidity=0.009 cc. of normal KOH/g.; salt=0.02 cc. of N HClO₄/g.; M. P.=36°–39° C.; percent yield=93, molecular weight (ebullioscopic)=341 (theory=326.4); analysis, percent by weight: percent P=9.53 (theory=9.49); percent S=19.80 (theory=19.64); percent C=44.33 (theory=44.15); percent H=6.76 (theory=7.10).

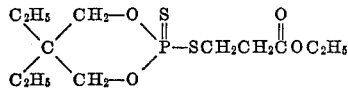

*Example 6*

One mol of methyl methacrylate containing 0.1 gram of hydroquinone was added dropwise to an agitated suspension of 0.3 mol of 5,5-diethyl-2-mercapto-2-thiono-1,3,2-dioxaphosphorinane in 200 grams of toluene during 15 minutes. The reaction mixture stood for 5 days at 25° C. and then was neutralized with dilute aqueous sodium bicarbonate, diluted with 600 cc. of ethyl ether, washed with water until neutral to litmus, inhibited with 0.1 gram of hydroquinone, and stripped by distillation to a kettle temperature of 80° C. under a pressure of less than 0.5 mm. of mercury. The resultant 2-(2-carbomethoxy-2-methylethylmercapto)-5,5-diethyl-2-thiono-1,3,2-dioxaphosphorinane was obtained as a viscous residue which was distilled at 135° C. under a pressure of less than 0.2 mm. of mercury in a falling film type still. The resultant yellow liquid distillate had the following properties: acidity=0.05 cc. of normal KOH/g.; salt=nil; molecular weight=336.6 (theory=326.4); analysis, percent by weight: percent P=9.36 (theory=9.49); percent S=19.1 (theory=19.64); percent C=46.0 (theory=44.15); percent H=7.4 (theory=7.10); percent yield=35.

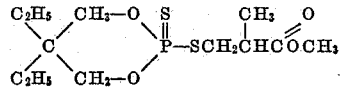

*Example 7*

To an agitated suspension of 0.2 mol of 5,5-diethyl-2-mercapto-2-thiono-1,3,2-dioxaphosphorinane in 150 grams of toluene held at 25° C. there were added dropwise 0.2 mol of n-butyl crotonate. The reaction mixture then was agitated for 13 hours at 25° C., allowed to stand for an additional 80 hours at that temperature, and heated at 50° C. for 3 hours. To the reaction mixture was added 2.0 grams of anhydrous potassium carbonate and heating was continued at 50° C. for 3 hours longer. The reaction mixture was washed with 100 cc. of concentrated aqueous sodium bicarbonate, washed with water until neutral to litmus, and stripped by distillation to a kettle temperature of 100° C. under less than 2 mm. of mercury. The resultant 2-(2-carbobutoxy-1-methylethylmercapto)-5,5-diethyl-2-thiono-1,3,2-dioxaphosphorinane was obtained as a light brown liquid residue having the following properties: acidity=0.08 cc. of normal KOH/g.; salt=0.02 cc. of N HClO₄/g.; $n_D^{30}$=1.5077; analysis, percent by weight: percent P=8.22 (theory=8.41); percent C=49.36 (theory=48.93); percent H=7.93 (theory=7.94).

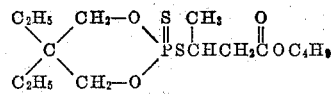

The invention herein described is susceptible of modification within the scope of the appended claims.

I claim:

1. Heterocyclic phosphorus-containing carboxylic esters having structures corresponding to the formula

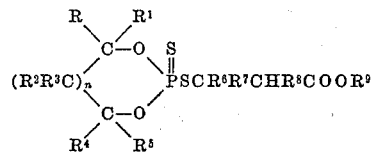

wherein R, R¹, R², R³, R⁴ and R⁵, respectively, designates a member of the class consisting of hydrogen and the alkyl groups having 1 to 20 carbon atoms; n is an integer from 0 to 1; R⁶ and R⁷, respectively, designates a radical of the class consisting of hydrogen, the lower alkyl and alkenyl radicals having one to four carbon atoms, and the phenyl, —CN, —Cl, —COOR⁹ and —CH₂COOR⁹ radicals wherein R⁹ designates a radical of the class consisting of the alkyl radicals having 1 to 18 carbon atoms, cyclohexyl, alkoxy-lower alkyl, phenyl and benzyl radicals; and R⁸ represents a member of the class consisting of hydrogen, the lower alkyl radicals, and the —Cl, —CN, —COOR⁹ and —CH₂COOR⁹ radicals.

2. 2-(2-carbalkoxyethylmercapto)-2-thiono derivatives of a 1,3,2-dioxaphosphorinane having 1 to 18 carbon atoms in the said alkoxy group.

3. 2-(2-carbalkoxyethylmercapto)-2-thiono derivatives of a 1,3,2-dioxaphosphorinane having at least one alkyl radical having 1 to 20 carbon atoms attached to at least one carbon atom of the dioxaphosphorinane ring, the other ring carbon atoms being unsubstituted.

4. 2 - (2 - carbaryloxyethylmercapto) - 2 - thiono derivatives of a 1,3,2-dioxaphosphorinane.

5. 2 - (2 - carbaryloxyethylmercapto) - 2 - thiono derivatives of a 1,3,2-dioxaphosphorinane having at least one alkyl radical having 1 to 20 carbon atoms attached to at least one carbon atom of the dioxaphosphorinane ring, the other ring carbon atoms being unsubstituted, the said aryloxy group of such compound being the phenoxy radical.

6. 2 - (2 - carbalkoxyethylmercapto) - 2 - thiono derivatives of a 1,3,2-dioxaphospholane.

7. 2 - (2 - carbalkoxyethylmercapto) - 2 - thiono derivatives of a 1,3,2-dioxaphospholane having at least one alkyl radical having 1 to 20 carbon atoms attached to at least one carbon atom of the dioxaphospholane ring, the other ring carbon atom being unsubstituted, the said alkoxy group having from 1 to 18 carbon atoms.

8. 2 - (2 - carbaryloxyethylmercapto) - 2 - thiono derivatives of a 1,3,2-dioxaphospholane having at least one alkyl radical having 1 to 20 carbon atoms attached to at least one carbon atom of the dioxaphospholane ring, the other ring carbon atom being unsubstituted, the said aryloxy group being selected from the class consisting of the phenoxy and benzyloxy radicals.

9. Process of producing heterocyclic, 1,3-dioxa-2-thiono-2-2-phosphacycloalkylthio carboxylic esters containing phosphorus in the heterocyclic ring, which comprises reacting a heterocyclic dithiophosphoric acid of the formula

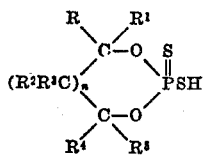

wherein R, $R^1$, $R^2$, $R^3$, $R^4$ and $R^5$, respectively, designates a radical of the class consisting of hydrogen and the alkyl radicals having 1 to 20 carbon atoms; and $n$ is an integer from 0 to 1, with an ester of an alpha, beta-olefinically unsaturated carboxylic acid, at a temperature within the range between about —20° C. and about 150° C.

10. Process of producing heterocyclic 1,3-dioxa-2-thiono-2-phosphacycloalkylthio carboxylic esters containing phosphorus in the heterocyclic ring, which comprises reacting a heterocyclic dithiophosphoric acid of the formula

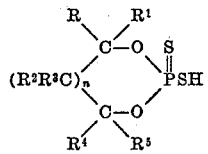

wherein R, $R^1$, $R^2$, $R^3$, $R^4$ and $R^5$, respectively, designates a radical of the class consisting of hydrogen and the alkyl radicals having 1 to 20 carbon atoms; and $n$ is an integer from 0 to 1, with an ester of an olefinically unsaturated carboxylic acid of the formula $$CR^6R^7=CR^8COOR^9$$

wherein $R^6$ and $R^7$, respectively, designates a radical of the class consisting of hydrogen, the lower alkyl and alkenyl radicals having 1 to 4 carbon atoms, and the $C_6H_5$—, —CN, —Cl, —$COOR^9$ and —$CH_2COOR^9$ radicals, wherein $R^9$ designates a radical of the class consisting of the alkyl radicals having 1 to 18 carbon atoms, the cyclohexyl, alkoxy-lower alkyl, phenyl and benzyl radicals; and $R^8$ designates a radical of the class consisting of hydrogen, the lower alkyl radicals, and the —CN, —Cl, —$COOR^9$ and —$CH_2COOR^9$ radicals, at temperatures within the range between about —20° C. and 150° C.

11. 2 - (1,2 - dicarbalkoxyethylmercapto) - 2 - thiono-1,3,2-dioxaphosphorinanes having at least one alkyl radical having 1 to 20 carbon atoms attached to at least one carbon atom of the dioxaphosphorinane ring, the other carbon atoms of the said ring being unsubstituted.

12. 2 - (1,2 - dicarbalkoxyethylmercapto) - 2 - thiono-1,3,2-dioxaphospholanes having at least one alkyl radical having 1 to 20 carbon atoms attached to at least one carbon atom of the dioxaphospholane ring, with no other substitution on a carbon atom of said ring.

13. 2 - (2 - carbbenzyloxyethylmercapto) - 2 - thiono derivatives of a 1,3,2-dioxaphosphorinane having at least one alkyl radical having 1 to 20 carbon atoms attached to at least one carbon atom of the dioxaphosphorinane ring, the other ring carbon atoms being unsubstituted.

References Cited in the file of this patent

UNITED STATES PATENTS 2,578,652    Cassaday _____ Dec. 18, 1951